(12) United States Patent
Fang et al.

(10) Patent No.: US 10,503,605 B2
(45) Date of Patent: Dec. 10, 2019

(54) METHOD OF DETECTING SOURCE CHANGE FOR FILE LEVEL INCREMENTAL BACKUP

(71) Applicant: Arcserve (USA) LLC, Eden Prairie, MN (US)

(72) Inventors: Zhenqiu Fang, Beijing (CN); Lei Li, Beijing (CN); Zhonghua Dang, Beijing (CN); Guangju Li, Beijing (CN)

(73) Assignee: Arcserve (USA) LLC, Eden Prairie, MN (US)

( * ) Notice: Subject to any disclaimer, the term of this patent is extended or adjusted under 35 U.S.C. 154(b) by 257 days.

(21) Appl. No.: 15/714,366

(22) Filed: Sep. 25, 2017

(65) Prior Publication Data

US 2019/0095286 A1 Mar. 28, 2019

(51) Int. Cl.
*G06F 16/00* (2019.01)
*G06F 11/14* (2006.01)

(52) U.S. Cl.
CPC ...... *G06F 11/1451* (2013.01); *G06F 11/1464* (2013.01); *G06F 11/1466* (2013.01); *G06F 2201/84* (2013.01)

(58) Field of Classification Search
CPC ............ G06F 11/1451; G06F 11/1464; G06F 11/1469; G06F 11/1466; G06F 2201/84; Y10S 707/99933; Y10S 707/99951; Y10S 707/99931; Y10S 707/99953; Y10S 707/99955; Y10S 707/962
See application file for complete search history.

(56) References Cited

U.S. PATENT DOCUMENTS

| | | | |
|---|---|---|---|
| 6,460,055 B1 * | 10/2002 | Midgley | G06F 11/1461 707/640 |
| 7,007,046 B2 * | 2/2006 | Manley | H04L 67/06 707/624 |
| 7,756,833 B2 * | 7/2010 | Van Ingen | G06F 11/1451 707/640 |
| 7,840,535 B2 | 11/2010 | Barboi et al. | |
| 8,046,332 B1 * | 10/2011 | Pruthi | G06F 11/1448 707/644 |

(Continued)

OTHER PUBLICATIONS

E.G. Coffman, Jr. and J. Eve, "File Structures Using Hashing Functions", vol. 18, Nov. 7, Jul. 1970, pp. 427-436. (Year: 1970).*

*Primary Examiner* — Cheryl Lewis
(74) *Attorney, Agent, or Firm* — Black, McCuskey, Souers & Arbaugh, LPA

(57) ABSTRACT

A system and method are presented that identify new, modified, unchanged, and deleted files in an incremental backup through a file list maintained on the backup destination. The FileList is a flat file in which file information about each file on a source node is stored sequentially into the file. During a subsequent incremental backup, the FileList is read sequentially from the backup destination and is used to generate a search tree. A hash value based on the file path is the key to the search tree, with the file's modified time and size being hashed together to form the value of the tree's key-value pair. Files are examined on the source and compared to the key-value pairs in the search tree. Status information in the search tree is modified to indicate discovered files. Unmodified status information identifies files that have been deleted since the previous backup.

20 Claims, 6 Drawing Sheets

(56) References Cited

U.S. PATENT DOCUMENTS

| | | | | |
|---|---|---|---|---|
| 8,051,043 B2* | 11/2011 | Young | .................. | G06F 11/1004 |
| | | | | 707/646 |
| 8,495,019 B2 | 7/2013 | Shisheng et al. | | |
| 8,606,751 B1* | 12/2013 | Starling | .............. | G06F 16/1824 |
| | | | | 707/634 |
| 8,874,517 B2* | 10/2014 | Choy | .................. | G06F 11/1451 |
| | | | | 707/640 |
| 9,690,796 B2* | 6/2017 | Itasaki | .................. | G06F 16/148 |
| 2015/0032785 A1* | 1/2015 | Itasaki | .................. | G06F 16/148 |
| | | | | 707/827 |
| 2015/0142745 A1* | 5/2015 | Tekade | ................ | G06F 11/1451 |
| | | | | 707/646 |

\* cited by examiner

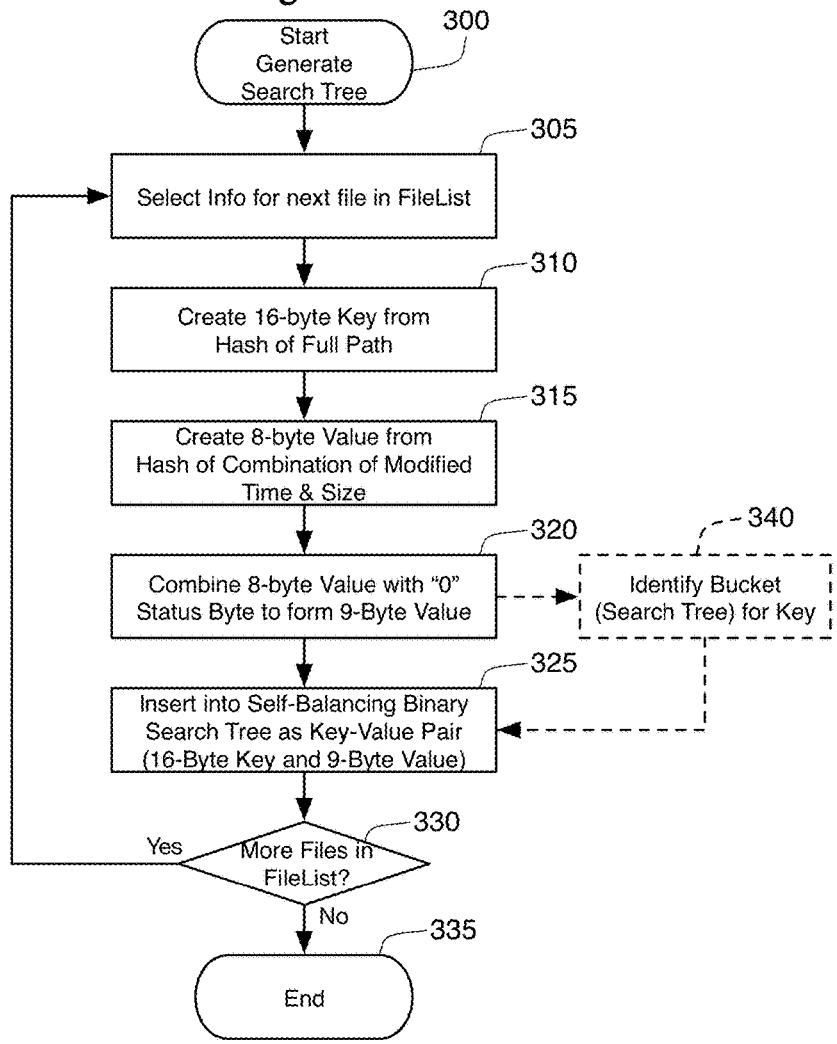
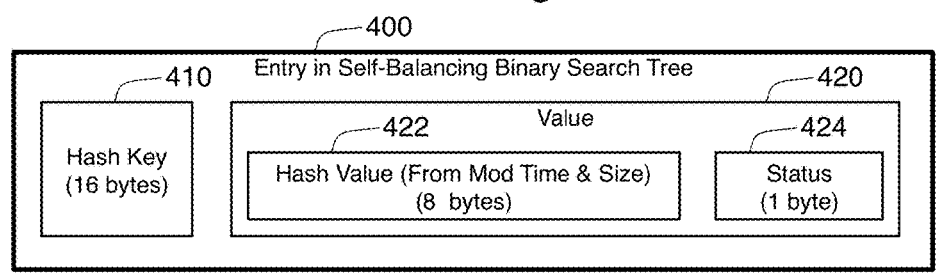

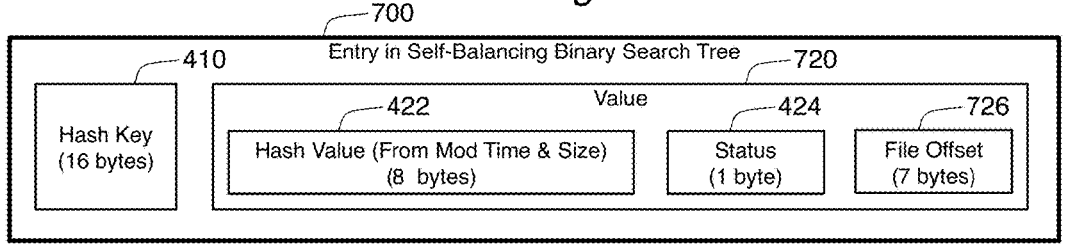
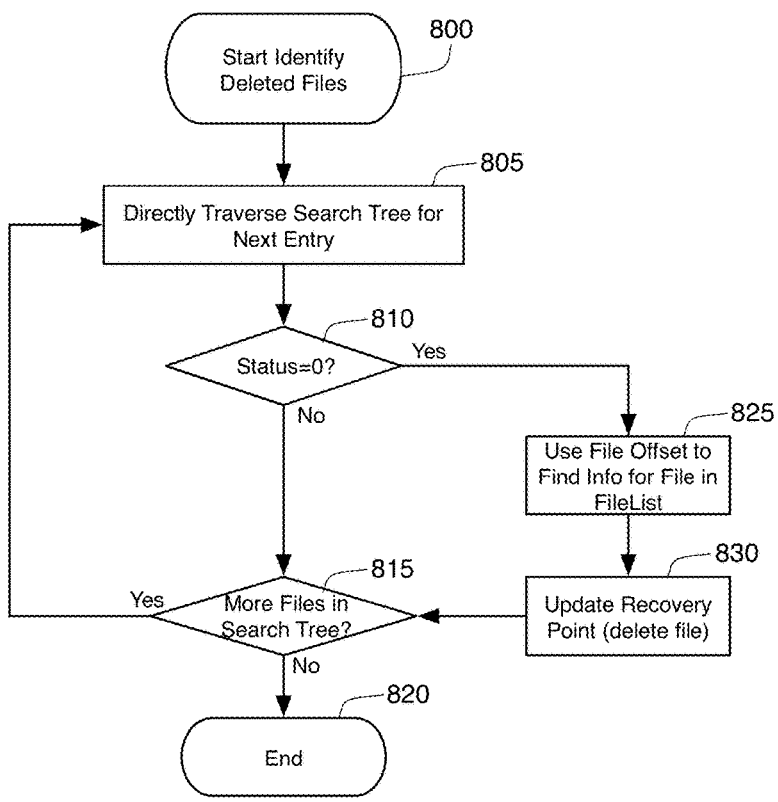

METHOD OF DETECTING SOURCE CHANGE FOR FILE LEVEL INCREMENTAL BACKUP

FIELD OF THE INVENTION

The present invention is directed to the field of automated backup of files in a computing environment. More particularly, the invention is directed toward an improved method of detecting changes in source files when performing incremental backups.

SUMMARY

The disclosed embodiments present a system and method for performing an incremental backup from a source disk. The techniques described are particularly useful when the source disk does not provide writing privileges to the backup software performing the backup, and in circumstances when the operating/file system on the source disk does not provide an archive bit for tracking backup file status.

In one embodiment, the backup software maintains a file list ("FileList") on the backup destination. The FileList can be a flat file in which file information about each file on a source node is stored sequentially into the file. The FileList is maintained at the source node level, as opposed to the recovery point, meaning that the FileList is replaced after each backup of the source node. During a subsequent incremental backup, the FileList is read sequentially from the backup destination in order to identify the state of all files on the source node as of the time of the previous backup. More particularly, the FileList is used to generate a search tree.

In one embodiment, the search tree is a self-balancing binary search tree utilizing a plurality of key-value pairs as entries in the search tree. The key for each of these key-value pairs is a hash value generated from the file's full-path description as found in the FileList. The value for the entry is a hash of the combination of the file's modified time and size also taken from the FileList. The value in the search tree also contains a small amount of data (such as 1 byte) to track status information about the file. Once the search tree is created, all of the files on the source node are accessed in turn. When accessed, the path of the source file is subjected to the hash algorithm and is used to search the search tree. If there is no entry in the search tree, then the file is considered new and submitted to a backup queue. If the hash of the source file path is found in the search tree, the modified time and size data from the source file are hashed and the result is compared with the value in the found entry in the search tree. If there is a match, the file is considered unchanged and the status information in the search tree is modified to indicate an unchanged file. If there is no match in this value comparison, the file is considered altered. In this case, the file is added to the backup queue, and the status information in the search tree is modified to indicate an unchanged file.

Two different methods for identifying deleted files are presented. In the first method, each file entry in the FileList is accessed again, and the path value is hashed and used to search the search tree. If the status for that entry in the search tree was not changed to indicate that the file was modified or remained unchanged, then it is known that this file has been deleted. When it is recognized that a file has been deleted, information about that file is removed from the recovery point for the currently generated backup. In the second technique, an offset location is added to the search tree during creation. The offset value indicates, for each file represented in the search tree, the offset into the FileList to be used to locate information for the file. In this second technique, the entire search tree is simply reviewed to look for status values indicative of a deleted file (e.g., where the status bit has not been changed). The paths for the deleted files are then accessed directly from the FileList using the offset found in the search tree, and those files are removed from the recovery point information.

BRIEF DESCRIPTION OF THE DRAWINGS

FIG. 3 is a flow chart showing a process of generating a self-balancing binary search tree utilized in the process of FIG. 2.

FIG. 4 is a schematic view of one embodiment of an individual leaf element in a binary search tree of the type created by the process of FIG. 3.

FIG. 7 is a schematic view of an another embodiment of an individual leaf element in a binary search tree of the type created by the process of FIG. 3.

FIG. 8 is a flow chart showing a second embodiment process for identifying deleted files in an incremental backup using a binary search tree of the type generated by the process of FIG. 3.

DETAILED DESCRIPTION

File Incremental Backup

Figure 1:
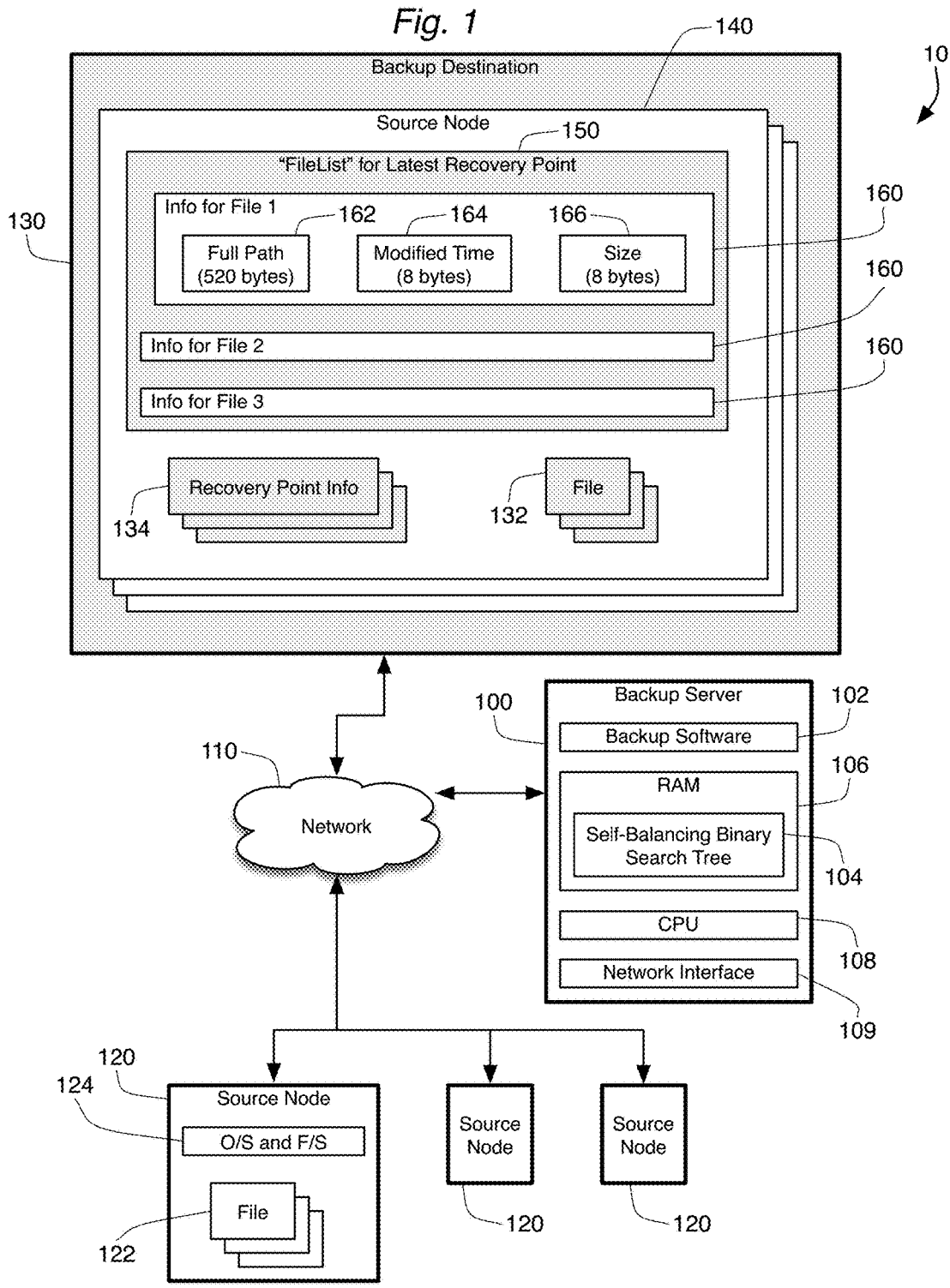
FIG. 1 is a schematic view of context and primary components in which at least one embodiment of the present invention is utilized.

FIG. 1 shows a backup system 10 in which a backup server 100 is responsible for backing up files 122 on one or more source disks or nodes 120. The backup server 100 comprises one or more computers operating together to perform the backup of the files 122. As such, the server 100 contains backup software 102 containing programming instructions that program one or more processors 108 to execute the steps necessary to perform the backup. The server 100 also contains a network interface 109 to allow communication with the source nodes 120 over the network. The files 122 are copied over a network 110 to a backup destination 130. The backup destination 130 may be directly connected to the backup server 100 over a channel interface, or may communicate with both the server 100 and the source nodes 120 over the network 110 (as shown in FIG. 1). The backup destination 130 may be one or more physical disks, or may comprise one or more logical disks made up of a plurality of separate physical disks.

Note that the files 122 that are backed up include both files and folders on the source node 120. This disclosure uses the term "files" to refer to all files, folders, and similar data and structural elements on the source node 120 that are copied by the backup system 10.

While information about the backup (backup metadata) may be maintained in the backup server 100, it is also possible to maintain this metadata on the backup destination 130 itself. In at least one embodiment, the metadata information is stored on a node by node basis, as is shown schematically by element 140 in FIG. 1. The backup destination 130 stores the file backups 132, as well as information about particular recovery points 134 for a source 140. A recovery point represents the status of the files 122 of a source node 120 at a particular time. In the event of data loss or inaccessibility of the source node 120, a user can restore some or all the files 122 of the source node at a particular recovery point 134. During file recovery, backup files 132 identified in the recovery point information 134 for the selected recovery point are copied back to the source node 120 to restore the files 122 of the source node 120 to the condition they were in at the time of that recovery point.

File (or file-level) incremental backup is a type of computerized file backup that only copies files that have changed on the source node 120 since the previous backup occurrence. For example, in an incremental back-up system such as system 10, a full backup of all files on a source node 120 might be backed up only once or twice a week. In this type of backup, if a full backup was performed on a first day, the second day's backup would be an incremental backup that would back up only those files that had changed since the first day's backup, while the third day's incremental backup will only back up files that have changed since second day's incremental backup. In the context of this description, the phrase "incremental backup" will be understood to refer to this type of file-level incremental backup. Each full and incremental backup might represent a separate recovery point that is tracked by information 134.

There are three types of changes to files 122 on a source 120 that can be noticed and handled in an incremental backup. First, the content of a file 122 might have changed since a previous backup. When this occurs, the incremental backup will make a copy of the changed file 122 (or, in some cases, only those portions of the file 122 that have changed will be copied). Second, a new file 122 could be identified on the source 120, which would cause that new file 122 to be copied as part of the incremental backup. Modern versions of backup software 102 also tracked a third type of change, in which the software 102 notices when a file 122 has been deleted from the source 120. Although no data from the deleted file is copied when a deleted file is detected, tracking the fact that a file has been deleted simplifies the creation of specific recovery point information 134 that more accurately reflects the state of the source node 120 at the time of the backup.

One technique for identifying new, modified, and deleted files 122 on a source 120 is for the backup software 102 to adjust an "archive bit" associated with the file 122 on the source node 120. This option is available only when the operating system/file system 124 managing the source files 122 on the source node 120 provides the archive bit as a file attribute, and not all file systems 124 provide such an attribute. Alternatively, the backup software 102 may use the timestamp of the last change made to a file 122, which is the technique typically used on sources maintained by Linux and UNIX operating systems 124. Both of these techniques require that the back software 102 have the ability to record or modify the data or metadata on the source node 120 in order to effectively identify file changes.

In some circumstances, however, the backup software 102 is not granted the ability to modify the source node 120. For example, when the backup software 102 accessing source files 122 via a CIFS (Common Internet File System) share 124, the software 102 will not be allowed to modify or record anything on the source node 120. In these circumstance (where the backup software 102 has read-only access to the source nodes 120), it is necessary for the backup software 102 to generate and maintain catalog-like information for each recovery point. Information must be maintained for each file 122 on a source node 120, including the full-path, modification time, and size of each file 122.

Efficiency Increased Through Search Tree

In order to maximize the speed in which an incremental backup can be performed, system 10 stores information about completed backups in a simple "FileList" 150. The FileList 150 is effectively a flat file that contains information entries 160 for each of the files 122 found in the last backup performed by the backup server 100 for a particular source node 120. The information entry 160 stored for each file 122 in the FileList 150 includes the full path of the file 162 in the file system 124 of the source node 120. In one embodiment, 520 bytes are provided for this full path data 162, which is sufficient for Unicode support for the maximum path length allowed in the Windows API (the "MAX_PATH", or 260 characters). The file information 160 further includes the modification time 164 for the file, as well as the size of the file 166. The modification time 164 and the file size 166 are both 8 bytes in the embodiment shown in FIG. 1. These two data items 164, 166 together serve as file content information. If a file's modification time 164 and file size 166 are unchanged, it is extremely likely that the file is unchanged as well. If the file content information 164, 166 has changed, it is likely that the file is no longer the same file. With this embodiment, information 160 about each file 122 on the source node 120 is stored in 536 bytes. Note that the FileList 150 contains information only about the latest backup performed on a source node 120, which means that the FileList 150 is not maintained separately for each recovery point 134 for a node 120.

In the preferred embodiment, the FileList 150 is not a "catalog," which would organize the file information in some systematic order (such as alphabetical order). Rather, the information items 160 in the FileList 150 are written sequentially to the FileList 150 in an unordered manner. The unordered nature of the FileList 150 provides important efficiencies in both the generation of, and the later use of, that FileList 150 by avoiding unnecessary disk seeks. Disk seeks require random access to the storage device, and on normal HDDs (Hard Disk Drives) repeated disk seeks can cause severe performance issues.

Rather than relying on disk seeks during the comparison between files 122 on the source nodes 120 and the data 160 in the FileList 150, the backup software 120 in system 10 reads the entire FileList 150 from the backup destination 130 and builds a "self-balancing binary search tree" 104 in the random access memory (RAM) 106 of the Backup Server 100. These types of search trees 104 provide for very efficient searching. In one embodiment, the search tree 104 is built on a plurality of key-value pairs, with ordering in the search tree being based solely on the key. Information for each file 160 in the FileList 150 is found in each entry/leaf in the search tree 104. The key to the search tree 104 is based on the full path 162 of each file. In the preferred embodiment, the full path 162 is subjected to a hashing algorithm that creates a hash value of a much smaller size than the full path 162 maintained in the FileList 150. Each key in the search tree 104 is associated with a value, which in the preferred embodiment includes data representing the modified time 164 and size 166 of the file, and data representing the new status of the file. In at least one embodiment, the modification time 164 and size 166 are also subjected to a hashing algorithm and the resulting hash value is added to the status information for the file to be the value field of the search tree's key-value pair.

Overall Method 200

Figure 2:
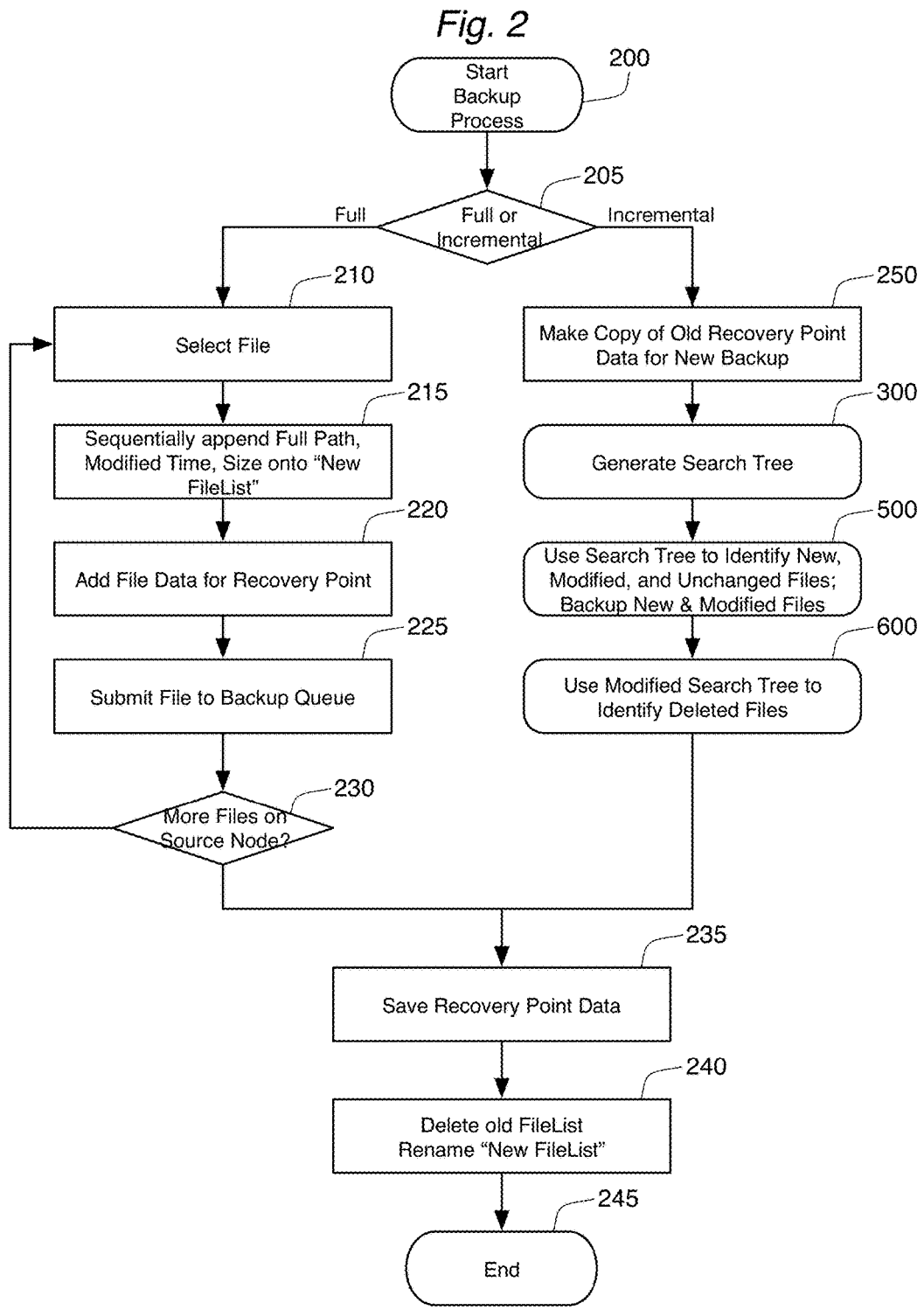
FIG. 2 is a flow chart showing a process of operating a backup process in one embodiment of the present invention.

One embodiment of the overall method 200 to perform backups using the backup system 10 of FIG. 1 is shown in FIG. 2. The method 200 starts with a determination at step 205 as to whether a full or incremental backup of a source node 120 is being performed. If a full backup is being performed, then the backup software 102 does not need to compare files 122 on the source node 120 with files already backed up by the system 10, because all files 122 are copied during a full backup. The full backup process begins at step 210, where a file 122 is selected. At step 215, the file's full path, modified time, and size are written to the end of a "NewFileList" file on the backup destination 130. The NewFileList file will become the FileList 150 for the source node 140 on the backup destination 130 when the backup of the source node 120 is complete. The NewFileList file is generally written in the same general location on the backup destination 130 as the FileList 150 would be written so that the NewFileList file can take the place of any existing or old FileList 150 file by simply renaming NewFileList. If, at step 215, NewFileList does not yet exist, then step 215 will create this file and then append to it the information 160 for the currently selected file.

At step 220, any information about the selected file that is required to describe the recovery point 134 is identified and used as appropriate. The present invention is not directed toward the maintenance of recovery point information 134, and the use of such information 134 when restoring lost files 122. Prior art methods for tracking and using such information may be used.

At step 225, the file is submitted to a backup queue 225. The backup queue is responsible for copying files 122 on the source node 120 to the backup files 132 on the backup destination 130. By placing the files to backup in a queue, the backup software 102 can continue its evaluation of the source node 120 without waiting for the physical copying of the files 122 to complete. The operation of a backup queue is also standard in the art of backup systems.

At step 230, the method 200 determines whether there are any more files on the source node 120 to be evaluated. If so, the method returns to step 210, where the next file is examined. If all of the files 122 on the source node 120 have been evaluated, the method continues to step 235. At this point, data 160 for all of the files 122 on the source node have been added to the NewFileList file. Also, data necessary to define the recovery point has been collected and all of the files 122 have been submitted to the backup queue for copying. Step 235 completes the creation of the recovery point 135 for the backup system 10, although this step 235 may not be necessary depending on the actions taken at step 220. At step 240, the backup software 102 then deletes the (now outdated) FileList file that contained information about the status of files from the previous recovery point, and then renames NewFileList to FileList 150. This allows the FileList 150 for the just-completed recovery point to be used the next time the same source node 120 is accessed for an incremental backup. Note that the file size for the FileList 150 should be manageable by most configurations of system 10. If each file information entry 160 in the FileList 150 is 536 bytes, the FileList 150 would be approximately 5 GB for a source node 120 having about 10 million files. The method 200 then ends at step 245.

Returning to step 205, in some instances this step 205 will determine that an incremental backup is to be run. In this case, only files 122 on the source node 120 that are new or have been modified since the last recovery point on the source node are to be copied to the backup destination. In the present invention, a search tree is used to determine which files are new or have been modified. The process for performing the incremental backup starts at step 250, in which the recovery point data 134 from the previous recovery point is copied over for the current incremental backup. By reusing information about the files, folders, and file system hierarchy from the prior recovery point, it will only be necessary to note modifications to this data during the incremental backup as opposed to reconstructing all of this data from the evaluation of the files 122 on the source node 120.

The next step is to generate the search tree 104 at the backup server 100 using the data in the FileList 150 found on the backup destination 130. This step is actually process 300, which is described in more detail below in connection with FIG. 3.

When the search tree 104 has been created, the search tree 104 is compared against each of the files 122 found on the source node 120 in order to identify new, modified, and unchanged files 122. This is accomplished using process 500, which is described below in connection with FIG. 5. This process 500 will also add files to the NewFileList, much like was done in step 215 during a full backup.

Once all the files 122 on the source node 120 are compared to the search tree 104 in process 500, each of these files 122 have been identified as a new file, a modified file, or an unchanged file. Step 600 is then applied in order to identify files 122 that used to be on the source node 120 and are there no longer (the deleted files). Step 600 is explained in detail below in connection with FIG. 6. An alternative embodiment is also described below using process 800 instead of process 600 to find deleted files.

Information about new, modified, and deleted files are then saved as the recovery point information 134 for the current recovery point in step 235. As explained above, one method of creating the recovery point information 134 is to copy the old recovery point data in step 250, and then modify this data to reflect new, modified, and deleted files. Next, at step 240, the old FileList 150 is deleted and the NewFileList (created during process 500) is renamed to FileList 150 so that it can be used for the next incremental backup. The process 200 then ends for the incremental backups at step 245.

Generating Search Tree (Method 300 and Entry 400)

FIG. 3 shows method 300 for generating the search tree 104 based on the FileList 150 for the last completed backup for that source node 120. As explained above, one embodiment of the present invention uses a self-balancing binary search tree 104. This is a particular type of search tree that is designed to automatically balance the tree in order to minimize the tree's height. This is useful because the time to search the resulting tree 104 increases with the height of the tree 104 being searched. Techniques for creating a self-balancing binary search tree 104 that are based upon adding new nodes to the tree and then balancing the resulting tree are well-known in the prior art. Any of these techniques can be used to generate the search tree 104 generated by method 300. Although self-balancing trees are advantageous in terms of ensuring a minimized height, other search trees (such as a random binary search tree) could be utilized, especially if the hash algorithms used in step 310 (described below) produce an effectively randomized hash result based on differing inputs. Note also that the generated search tree 104 is kept by the backup software 102 in the random access memory of the backup server 100 in order to maximize the speed at which the search tree 104 is generated and used. If a search tree 104 uses about 25 bytes for each file 122, the total size for the search tree 104 should be about 238 MB, which is easily managed in memory.

The first step 305 in method 300 is to select information for a particular file 160 from the FileList 150. The first time this step 305 is performed, the information 160 will be for the first entry in the FileList 150, with the next occurrence of the step 305 taking the next entry in the FileList 150. This sequential selection of information entries 160 is important because, since each entry was written sequentially to the file, each entry can be read sequentially so as to minimize disk activity at the backup destination 130. The information 160 selected at this step 305 will include the full path of the file 162, the modified time for the file 164, and the size of the file 166. In one embodiment, these data entries 162, 164, 166 are 520 bytes, 8 bytes, and 8 bytes, respectively, in size. In some embodiments, the modified time 164 and the size 166 are combined into a single 16 byte field.

At step 310, a hash algorithm is applied to the file path 162 in order to generate a 16-byte hash result that will be used as the key for the search tree 104. The hash algorithm used could be one of the many hash algorithms known in the prior art. Step 315 then combines the modified time 164 and the size 166, and then uses the combination as input into the hash algorithm to create an 8-byte hash value. The hash algorithms used in steps 310 and 315 can be the same algorithm, although the resulting hash values are of different sizes. A hash algorithm that directly supports arbitrary-length output can be used for this purpose, although known techniques can also be used to adjust the length of the hash algorithm output (such as the selection of a subset of the bits generated by the algorithm).

The 8-byte hash value generated at step 315 is then combined with a single known-value byte (such as a "0" byte) to generate a value of 9 bytes in length. This known-value byte will track the status of the files in the search tree 104, and therefore will be referred to herein as the status byte. Step 325 then adds key-value leaf/entry 400 (shown in FIG. 4) to the self-balancing tree 104, where the key is the 16-byte hash value 410 generated at step 310 and the value is the 9-byte value 420 generated at step 320 consisting of the 8-byte hash value 422 from step 315 and the 1-byte status value 424. In embodiments that use a self-balancing binary search tree, the entry 400 might have one extra bit for every record to ensure the tree remains approximately balanced. Furthermore, it is not necessary that the status value 424 be one byte in length, as a two-bit value would suffice in identifying four separate status results.

Step 330 then determines if there are more file entries 160 in the FileList 150. If so, processing returns to step 305. If not, the process ends at step 335. Note that step 340 is presented on FIG. 3 in dashed-line format to indicate its optional nature. The buckets of step 340 are described in more detail below.

Identifying New, Changed, and Unchanged Files (Method 500)

Method 500 is responsible for identifying which files 122 on the source node 120 are new, which files 122 have been modified, and which files 122 are unchanged. New and modified files 122 must be copied to the backup files 132 on the backup destination 130. The method 500 begins by creating a new file on the backup destination 130, which is called "New FileList" in this disclosure. This file will eventually become the FileList 150 for the recovery point once the incremental backup is complete.

At step 510, a first file is selected from the source node 120. The order of file selection on the source node 120 can be the same as accomplished in the prior art, as any order will be effective in implementing the present invention. Once the file is selected, the full path, modified time, and size of the file are added to the New FileList file created at step 505. Note that additions made to this file at step 515 will generally take the form of sequential appends to the file so as to minimize the movement of the disk head when writing the file.

Figure 5:
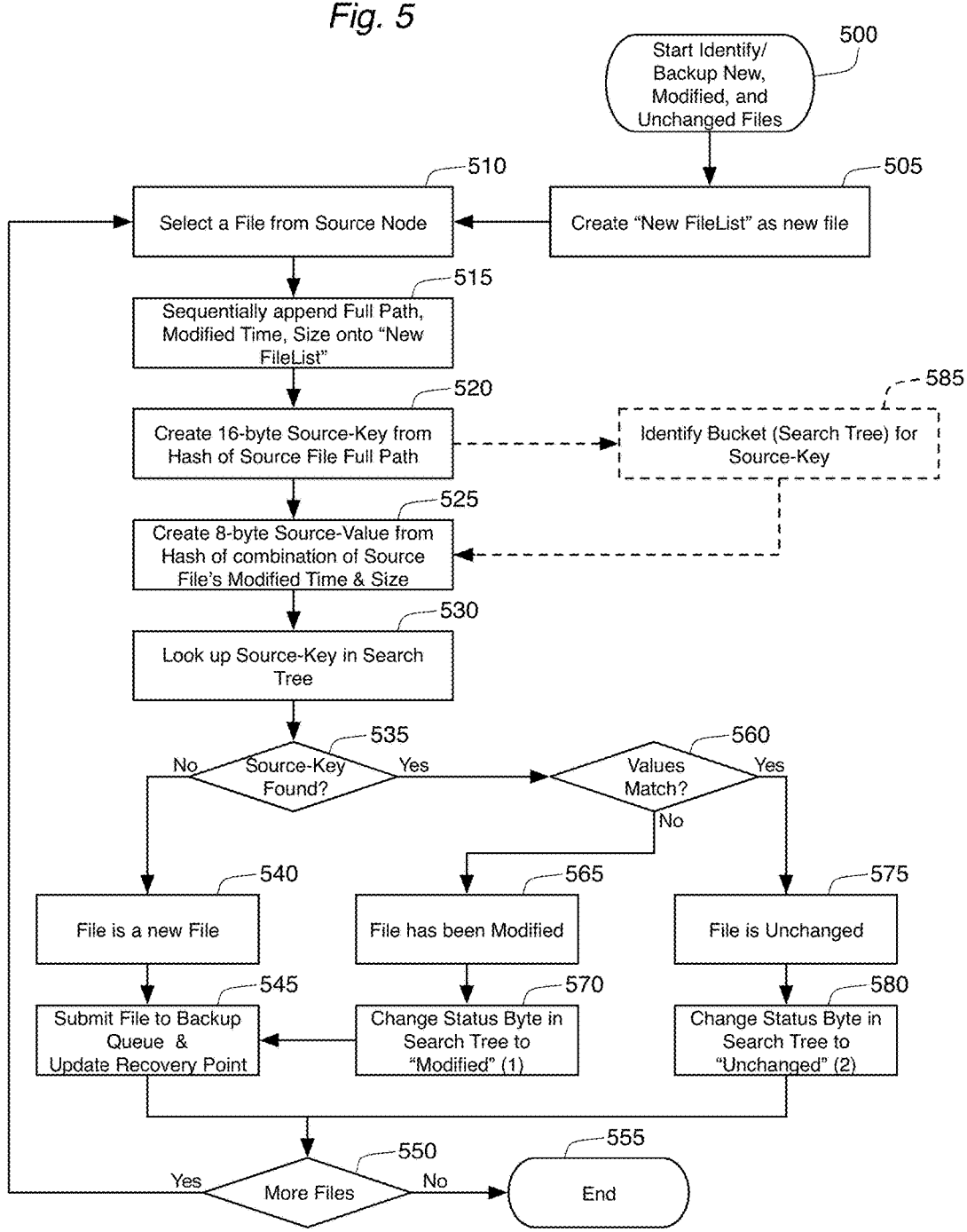
FIG. 5 is a flow chart showing a process of identifying new, modified, and unchanged files in an incremental backup using a binary search tree of the type generated by the process of FIG. 3.

At step 520, the full path of the file is used as input into the same hash algorithm used in step 310 in order to create a 16-byte hash value (referred to as the "Source-Key" in FIG. 5). At step 525, a "Source-Value" is create by inputting the Source File's modified time and size into the hash algorithm used in step 315 (the hash algorithms from steps 520 and 525 could be identical). At step 530, the search tree 104 generated by method 300 is accessed using the Source-Key as the input search key. Since the search tree 104 was generated based on the FileList 150 representing the previous backup performed on the source node 120, searching the search tree 104 will determine if this file on the source node 120 (technically it is the file's path that is being examined) had been backed up in the previous backup.

Step 535 determines whether or not the Source-Key was found in the search tree 104. If the Source-Key is not found in the search tree 104, then the backup software 102 will know that this source file 122 was not previously backed up. In other words, this is identified as a new file in step 540. The "identification" of a file as "new" (or as "modified" or "unchanged" in steps 565 and 575 which are described below) may not involve any other physical acts other than recognizing the file as having this type of characteristic. As a new file, this file will need to be backed up, step 545 will submit the file/file path to a backup queue. The backup queue is responsible for ensuring that a backup 132 of this file 122 is made on the backup destination 130. The operation of a backup queue is well known in the prior art. As explained above, process 200 made a copy of the old recovery point data for this incremental backup at step 250. Step 545 will take whatever steps are necessary to ensure that information about this new file 122 is added to this recovery point information 134 for this backup. Next, step 550 will determine if there are more files 122 on the source node 120 to be examined. If so, processing returns to step 510. If not, the process 500 ends at step 555.

If the Source-Key is found in the search tree 104 at step 535, then the found entry 400 in the tree 104 is examined. The Source-Value generated at step 525 is compared with the first 8 bytes (422) of the search tree value 420 (step 560). If these values are not identical, then it can be reasonably assured that the modified time for the file 122 or the size of the file 122 (or both) have changed since the last backup. As a result, this is a modified filed (step 565) that needs to be backed up and have its recovery point data updated. Before this is accomplished (at step 545), the method 500 will change the status byte 424 for this entry 400 in the search tree 104 to indicate that this file 122 is a modified file. In one embodiment, the status byte 424 will be changed to a "1" value. After the status byte 424 has been modified in step 570, processing continues at steps 545 and 550, which were described above.

If the value 422 in the found search tree entry 400 matches the Source-Value generated at step 525, then the file 122 on the source node 120 has not changed since the last backup (step 575). There is no need to modify the recovery point data for this file 122 or to add the file to the backup queue.

Nonetheless, step 580 will change the file's status byte 424 in the search tree 104 to a value that represents "unchanged" (a "2" value in FIG. 5). Processing then continues with the check for more files 122 on the source node 120 at step 550.

Identifying Deleted Files (Method 600)

Figure 6:
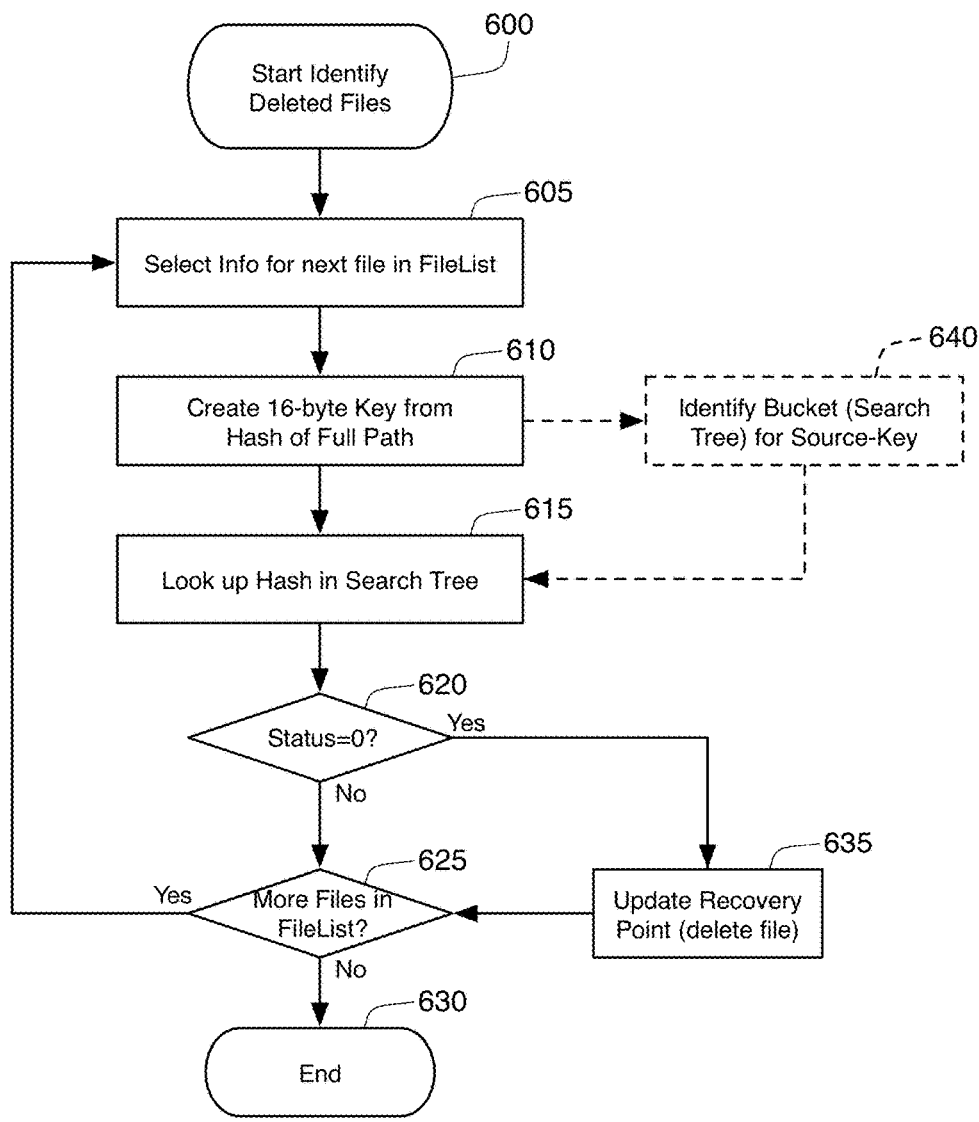
FIG. 6 is a flow chart showing a process of identifying deleted files in an incremental backup using a binary search tree of the type generated by the process of FIG. 3.

FIG. 6 discloses a method 600 for identify deleted files, meaning files that were found in the previous backup as indicated by the FileList 150 but are not currently found on the source node 120. Since method 500 has gone through all of the files 122 on the source node 120 and has changed the status values 424 for all found entries in the search tree 104, the search tree 104 now contains information on all the deleted files. All entries 400 in the search tree 104 that continue to have a status value 424 of "0" will identify all of the file information entries 160 that were not found during method 500—the deleted files. However, the search tree 104 cannot directly identify these files since the search tree does not contain the full path of these files. The full path is found in the 520-byte data field 162 of the FileList 150, but this large data field was reduced to a 16-byte hash value 410 in the search tree 104. Method 600 combines these data sources in order to identify the deleted files.

The method 600 begins by selecting a first file information entry 160 in the FileList 150 for the previous backup at step 605. At step 610, a 16-byte hash value is created for the full path 162 value using the same algorithm used in step 310. This hash value is then used to search the search tree 104 in step 615. When the appropriate entry 400 is found (it will be found, as the same values in the FileList 150 were used to create the search tree 104 in method 300), the status value 424 is examined. If this value is anything other than "0," then the identified file 122 was found on the source node 120 and step 625 will determine if there are any more file information entries 160 in the FileList 150 at step 625. If so, the process 600 returns to step 605. If not, the process ends at step 630.

If step 620 finds that the status value 424 is "0," then this is a deleted file. Since the purpose for identifying the deleted file is to update the recovery point data for the current backup to show that this file is no longer in the recovery point, this data is updated at step 635. Processing then continues at step 625.

Alternative Embodiment: Buckets

It is possible that the self-balancing binary search tree 104 will have too many entries for efficient inserting and searching performance. In these cases, it is possible to split the search tree 104 into multiple trees. To do this, all files could be divided into multiple "buckets," with each bucket corresponding to a single search tree 104. In this way, the number of entries in a single tree could be reduced. For example, a source node 120 may have 10 million files (folders and files). This number of entries could significantly impact the performance of the search tree 104. If thirty-two separate buckets were created, thirty-two different search trees could be utilized with each tree having approximately 312,500 entries.

Optional step 340 in FIG. 3 is responsible for identifying a particular bucket/search tree 104 for a given file. In most cases, this is accomplished mathematically based on the 16-byte key hash value generated in step 310. In one embodiment, a byte from the key hash value is selected, and the bucket number is determined using a modulo function:

Bucket Number=$a\%n$ where "a" is the selected byte (such as the 16th byte of the key), and "n" is the total number of buckets (such as 32), while "%" is the modulo operation. After step 340 selects the appropriate bucket number, the corresponding search tree 104 is then used in step 325.

If buckets are used to generated different search trees 104, the same operation must be performed to identify the appropriate bucket in methods 500 and 600. In FIG. 5, optional step 585 is responsible for identifying the bucket (and hence, the appropriate search tree 104) before the search tree is accessed in step 530. Similarly, in FIG. 6, optional step 640 identifies the bucket and search tree 104 before the search tree is accessed in step 615.

Some of the Benefits Achieved

By using the self-balancing search tree 104, the above described embodiments increase the efficiency of incremental backups in system 10. In particular, random disk IO is greatly reduced. This is made possible through use of the search tree 104. The self-balancing search tree 104 does not require that the information entries 160 be read in any order when creating the tree 104, therefore the FileList 150 is simply written and read sequentially. The information entries 160 are written in steps 215 or 515 sequentially based only on the order in which files 122 are identified on the source node 120. This leaves the information entries 160 unordered in any fashion in FileList 150. They are then read out in the same sequential (and unordered) fashion at steps 305 and 605.

To perform the entire backup process 200 for incremental backups, all that is required is to enumerate the files 122 on the source node 120 once, sequentially read the FileList 150 twice, and sequentially write the New FileList once. This sequential reading and writing of files is much more efficient than the random access of files from a disk that is usually encountered when conducting an incremental backup of this type. When dealing with a sequential backup of millions of files 122, great efficiency improvements are realized.

Alternative for Identifying Deleted Files (Entry 700 and Method 800)

FIG. 7 shows an alternative embodiment in which each leaf/entry 700 in search tree 104. This alternative entry 700 uses the same 16-byte hash key 410 created in step 310 as entry 400 shown in FIG. 4. The value 720 of the key-value pair in FIG. 7, however, includes not only the hash value 422 and the status byte 424 from value field 420, but also a file offset value 726. The file offset value 726 indicates how to file the file information 160 for this particular entry 700 in the FileList 150. The offset value 726 identifies the offset location of the information 160 from the beginning of the FileList 150. In this way, it is possible to directly access this information 160 in the FileList 150 based on the data inside the search tree 104.

This search tree entry 700 is generated by the same method 300 as entry 400, with the only difference being that step 320 combines the 8-byte value from step 315 with both the "0" status byte and the 7-byte file offset value in order to create the 16-byte value 720 for the key-value pair.

This search tree entry 700 is used in method 800 shown in FIG. 8, which provides an alternative method for identifying deleted files. Method 800 can be used in place of method 600 for some incremental backup operations. Whereas method 600 identifies deleted files by examining each file information entry 160 in the FileList and then looking up that entry in the search tree 104 to identify status=0 files, method 800 directly accesses all the entries in the search tree 104 to find status=0 entries, and then uses the file offset value 726 to identify the file.

Method 800 begins at step 805 by selecting an entry 700 in the search tree 104. The status byte 424 for that entry 700 is examined in step 810 to determine if the status is "0." If it is not "0," then the file has not been deleted and the method continues in step 815 to see if any more files are in the search tree 104. If so, the next entry 700 is selected in step 805. If not, the process 800 ends at step 820.

If step 810 determines that the status 424 for an entry 700 is "0," then the file has been deleted at the source node 120. Step 825 then examines the file offset value 726 in the entry, and that offset value is used to directly access the file information entry 160 for that file. The full path 162 for that information entry 160 can be read from the FileList 150, and that information can be used, in step 830, to update the recovery point information to indicate that the file is no longer found on the source node 120. Processing then continues at step 815 to determine if more entries 700 exist in the search tree 104.

Because method 800 works differently than method 600, it has significantly different impacts on efficiency. While method 600 included no steps that required random access to files on the disk at the backup destination 130, method 800 deliberately uses a random access to the FileList 150 at a particular offset 726 in order to find the full path value 162 for the file. Thus, method 800 could prove to be significantly less efficient than method 600 in situations where numerous files have been deleted since the previous backup. However, in situations where file deletions are relatively rare with respect to the size of the FileList 150, the fact that method 800 does not require the generation of hash values for all entries in the FileList 150 could make method 800 more efficient than method 600.

Because methods 600 and 800 might each be more efficient in certain circumstances, backup software 102 could be written to select between the two methods in certain circumstances. Historical information, for example, could be used to determine whether or not deleted files are commonly found on a source node 120. If deleted files are rare, the backup software 102 could implement method 800 for that source node 120. If deleted files are common, method 600 could be implemented. In fact, through consistent monitoring, the backup software 102 could adapt to changing circumstances and switch between the two methods 600, 800 as appropriate according to the current deletion patterns of the source node files 122. In close cases, the backup software 102 could attempt both approaches in consecutive backups and use the actual time period used to complete the methods 600, 800 to choose between the methods 600, 800 for future incremental backups.

Hash Collisions

The above descriptions utilizing hashing algorithms to create a hash value of the full-length of the path. Matching files are determined by comparing the hash value of the path for the two files. With hashing algorithms, there is always the potential for collisions—where two different inputs (file paths) generate identical hash values. For 16-byte hashes of the type used in some of the above-described embodiments, the probability of a collision is $\frac{1}{2}^{128}$. Even if the source node 120 contains ten million files, the probability of a collision is extremely small. If an 8-byte hash value is used for the file content information 142, the odds of a collision would be $\frac{1}{2}^{64}$, which is again extremely unlikely.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method for backing up a source node to a backup destination comprising:
   a) performing a full backup of the source node by:
      i) creating an empty file list,
      ii) identifying a first set of source files available to be backed up on the source node at a first time, and
      iii) for each file in the first set of source files:
         (1) appending an information entry to the file list containing full path information and content information for the file, and
         (2) backing up the file to the backup destination;
   b) after the full backup is performed, performing an incremental backup of the source node by:
      i) reading the file list, and for each information entry in the file list:
         (1) generating a key-value pair, with the key being determined by hashing the full-path information in the information entry, and the value being based on the content information for the information entry, and
         (2) adding the key-value pair to a self-balancing binary search tree according to the key, wherein the resulting search tree contains key-value pairs for all information entries in the file list,
      ii) identifying a second set of source files available to be backed up on the source node at a second time, each source file in the second set of source files having a source path and source content information,
      iii) for each source file in the second set of source files, searching the search tree to find a matching key-value pair, using as search input the result of hashing the source path of the source file, and then comparing the source content information to the value in the matching key-value pair,
      iv) for source files where the searching step did not find a matching key-value pair, identifying the source file as a new file and then backing up the new file to the backup destination;
      v) for source files where the searching step found the matching key-value pair and further wherein the value of the matching key-value pair did not match the source file content information, identifying the source file as a changed file and then backing up the changed-file to the backup destination, and
      vi) for source files where the searching step found the matching key-value pair and further wherein the value of the matching key-value pair matched the source file content information, identifying the source file as unchanged and not backup up the unchanged file.

2. The method of claim 1 wherein the file content information comprises modified time and file size for the file.

3. The method of claim 1, wherein the values in the key-value pairs are determined by hashing the content information for the information entry, and wherein the searching step compares content information for the source file by first hashing the content information for the source file before comparing to the value in the matching key-value pair.

4. The method of claim 1, wherein source files are backed up to the backup destination by placing the source file on a backup queue.

5. The method of claim 1, further wherein:
i) the value in the key-value pair further comprises file status information that is set to a default value when the key-value pair is generated,
ii) for changed files, changing the status information for the matching key-value pair to first a value indicating that the file is a changed file, and
iii) for unchanged files, changing the status information for the matching key-value pair to a second value indicating that the file is an unchanged file.

6. The method of claim 5, wherein files deleted on the source node between the first time and the second time are identified as deleted files by examining the search tree for key-value pairs having status information that remains set to the default value after all the source files identified in the second set of source files are processed.

7. The method of claim 6, wherein recovery point information is created during the full backup of the source node, and wherein the incremental backup modifies a copy of the recovery point information from the full backup by adding new files, modifying changed files, and deleting deleted files.

8. The method of claim 6, wherein deleted files are identified by:
i) reading the file list after all the source files in the second set of source files are processed in the incremental backup, and
ii) for each information entry in the file list:
(1) hashing the full-path information in the information entry to generate a lookup value,
(2) searching the self-balancing binary search tree using the lookup value to find a corresponding key-value pair, and
(3) determining whether the status value for the corresponding key-value pair is the default value.

9. The method of claim 6, wherein deleted files are identified by:
i) including an offset value in the value of the key-value pairs, wherein the offset value identifies the file offset of the information entry in the file list,
ii) examining each key-value pair in the self-balancing binary search tree after all the source files in the second set of source files are processed in the incremental backup in order to identify unaltered key-value pairs that have status information that remains set to the default value, and
iii) for each unaltered key-value pair, using the offset value to look up the related information entry in the file list and reading the full-path information from the related information entry in the file list.

10. The method of claim 6, wherein the deleted files are identified by one of the following two techniques:
i) a first technique comprising:
(1) reading the file list after all the source files in the second set of source files are processed in the incremental backup, and
(2) for each information entry in the file list, hashing the full-path information in the information entry to generate a lookup value, searching the self-balancing binary search tree using the lookup value to find a corresponding key-value pair, and determining whether the status value for the corresponding key-value pair is the default value,
ii) a second technique comprising:
(1) including an offset value in the value of the key-value pairs, wherein the offset value identifies the file offset of the information entry in the file list,
(2) examining each key-value pair in the self-balancing binary search tree after all the source files in the second set of source files are processed in the incremental backup in order to identify unaltered key-value pairs that have status information that remains set to the default value, and
(3) for each unaltered key-value pair, using the offset value to look up the related information entry in the file list and reading the full-path information from the related information entry in the file list, and
iii) further wherein a plurality of source nodes are backed up using the full backup of step a) and the incremental backup of step b), and further wherein a first subset of source nodes use the first technique and a second set of source nodes use the second technique.

11. The method of claim 1, wherein the incremental backup further comprises generating a new file list by appending a new information entry to the new file list containing full path information and content information for each source file in the second set of source files, wherein the new file list replaces the file list created by performing full backup after the incremental backup is complete.

12. A method for performing incremental backups of computer files comprising:
a) reading a file list containing a plurality of information entries, with each information entry containing data relating to a file backed up during a prior backup session, each information entry comprising full-path information and file content information;
b) for each information entry in the file list:
i) generating a key-value pair, with the key being determined by hashing the full-path information, and the value being based on the content information for the information entry, and
ii) adding the key-value pair to a search tree according to the key, wherein the resulting search tree contains key-value pairs for all information entries in the file list;
c) examining a source node to identify a plurality of source files, with each source file having a source path and source content information;
d) for each of the plurality of identified source files, searching the search tree to find a matching key-value pair, using as search input the result of hashing the source path of the source file, and then comparing the source content information to the value in the matching key-value pair;
e) for source files where the searching step did not find a matching key-value pair, identifying the source file as a new file and then backing up the new file to the backup destination; and
f) for source files where the searching step found the matching key-value pair and further wherein the value of the matching key-value pair did not match the source file content information, identifying the source file as a changed file and then backing up the changed-file to the backup destination.

13. The method of claim 12, further comprising:
g) for source files where the searching step found the matching key-value pair and further wherein the value of the matching key-value pair matched the source file content information, identifying the source file as an unchanged file and not backup up the unchanged file.

14. The method of claim 13, further comprising generating recovery point information identifying the state of the source files on the source node at the time of a backup event, wherein data representing new files are added to the recovery point information and data representing changed files are updated in the recovery point information.

15. The method of claim 12, wherein the file list is a flat file stored on the backup destination, and further wherein the flat file is read once, sequentially, in order to perform steps a) and b).

16. The method of claim 12, further comprising generating a new file list by sequentially adding a new information entry to the end of the new file list for each of the plurality of identified source files.

17. The method of claim 16, wherein the new file list replaces the file list read in step a) after completing steps a) through f).

18. The method of claim 12 wherein the file content information comprises modified time and file size for the file.

19. The method of claim 18, wherein the modified time and file size are combined and hashed before forming the file content information.

20. A backup server comprising:
 a) a processor;
 b) random access memory;
 c) a network interface to communicate over a network with a source node; and
 d) backup software programming comprising instructions causing the processor to perform:
  i) a full backup of the source node by:
   (1) creating an empty file list,
   (2) identifying a first set of source files available to be backed up on the source node at a first time, and
   (3) for each file in the first set of source files, appending an information entry to the file list containing full path information and content information for the file and then backing up the file to a backup destination, and
  ii) an incremental backup of the source node by:
   (1) reading the file list, and for each information entry in the file list: (i) generating a key-value pair, with the key being determined by hashing the full-path information in the information entry, and the value being based on the content information for the information entry, and (ii) adding the key-value pair to a self-balancing binary search tree according to the key, wherein the resulting search tree contains key-value pairs for all information entries in the file list,
   (2) identifying a second set of source files available to be backed up on the source node at a second time, each source file in the second set of source files having a source path and source content information,
   (3) for each source file in the second set of source files, searching the search tree to find a matching key-value pair, using as search input the result of hashing the source path of the source file, and then comparing the source content information to the value in the matching key-value pair,
   (4) for source files where the searching step did not find a matching key-value pair, identifying the source file as a new file and then backing up the new file to the backup destination;
   (5) for source files where the searching step found the matching key-value pair and further wherein the value of the matching key-value pair did not match the source file content information, identifying the source file as a changed file and then backing up the changed-file to the backup destination, and
   (6) for source files where the searching step found the matching key-value pair and further wherein the value of the matching key-value pair matched the source file content information, identifying the source file as unchanged and not backup up the unchanged file.

* * * * *